United States Patent [19]

Decker et al.

[11] Patent Number: 5,413,254
[45] Date of Patent: May 9, 1995

[54] VIBRATORY FEEDER

[75] Inventors: Edward B. Decker, Lake Wylie, S.C.; Edward G. Decker, Charlotte, N.C.

[73] Assignee: The Pullman Company, Lebanon, N.J.

[21] Appl. No.: 183,996

[22] Filed: Jan. 18, 1994

[51] Int. Cl.⁶ .............................................. B65G 65/44
[52] U.S. Cl. .................................... 222/199; 222/200; 222/564
[58] Field of Search ................ 222/185, 161, 198, 199, 222/200, 564

[56] References Cited

U.S. PATENT DOCUMENTS

| Re. 29,385 | 9/1977 | Miksitz | 222/199 X |
|---|---|---|---|
| 3,261,508 | 7/1966 | Wahl | 222/199 |
| 3,744,676 | 7/1973 | Dumbaugh | 222/161 |
| 3,853,247 | 12/1974 | Wahl | 222/199 |
| 3,971,493 | 7/1976 | Williams | 222/199 X |
| 3,973,703 | 8/1976 | Peschl | 222/199 |
| 4,285,447 | 8/1981 | Fairbank | 222/200 |
| 4,520,952 | 6/1985 | Wahl et al. | 222/199 |
| 4,545,509 | 10/1985 | Musschoot et al. | 222/198 |
| 4,546,872 | 10/1985 | Musschott | 22/199 X |
| 4,658,992 | 4/1987 | Peleus | 222/199 |

FOREIGN PATENT DOCUMENTS

| 991133 | 6/1976 | Canada | 222/200 |
|---|---|---|---|
| 54479 | 12/1967 | Poland | 222/200 |
| 1359324 | 7/1974 | United Kingdom | 222/199 |
| 1415721 | 11/1975 | United Kingdom | 222/199 |
| 2047841 | 12/1980 | United Kingdom | 222/200 |
| 592694 | 2/1978 | U.S.S.R. | 222/200 |

Primary Examiner—Kevin P. Shaver
Attorney, Agent, or Firm—William Squire

[57] ABSTRACT

A feeder housing is suspended from a material supply bin and has lower and upper cylindrical members with the upper member isolated from the lower member by a flexible collar which also seals the cavity formed by the members. The lower member is suspended from the upper member and has a concave bottom wall with a discharge port. A first fixed baffle next adjacent the bottom wall is a ring with shape of a segment of a toroid with angularly oriented sides having a central opening. A second conical baffle is over the central opening and is axially displaced toward the first baffle between a closed state and a material flow open state wherein material flow is normally arrested until the housing and baffles are vibrated. In a second embodiment, a single fixed baffle comprises a pair of symmetrical cones secured inverted relative to each other over a feeder housing discharge and inlet port. The feeder is attached over a portable bin for receiving material from a storage bin to fill the portable bin by vibrating the feeder and its baffle. The portable bin is transported without the vibrating drive to a destination point where it is inverted to empty its contents. When inverted a local vibratory drive is attached to the feeder. The symmetrical baffle arrests material flow until vibrated in the inverted position. Flat suspension springs support the upper and lower members in their inverted positions.

26 Claims, 4 Drawing Sheets

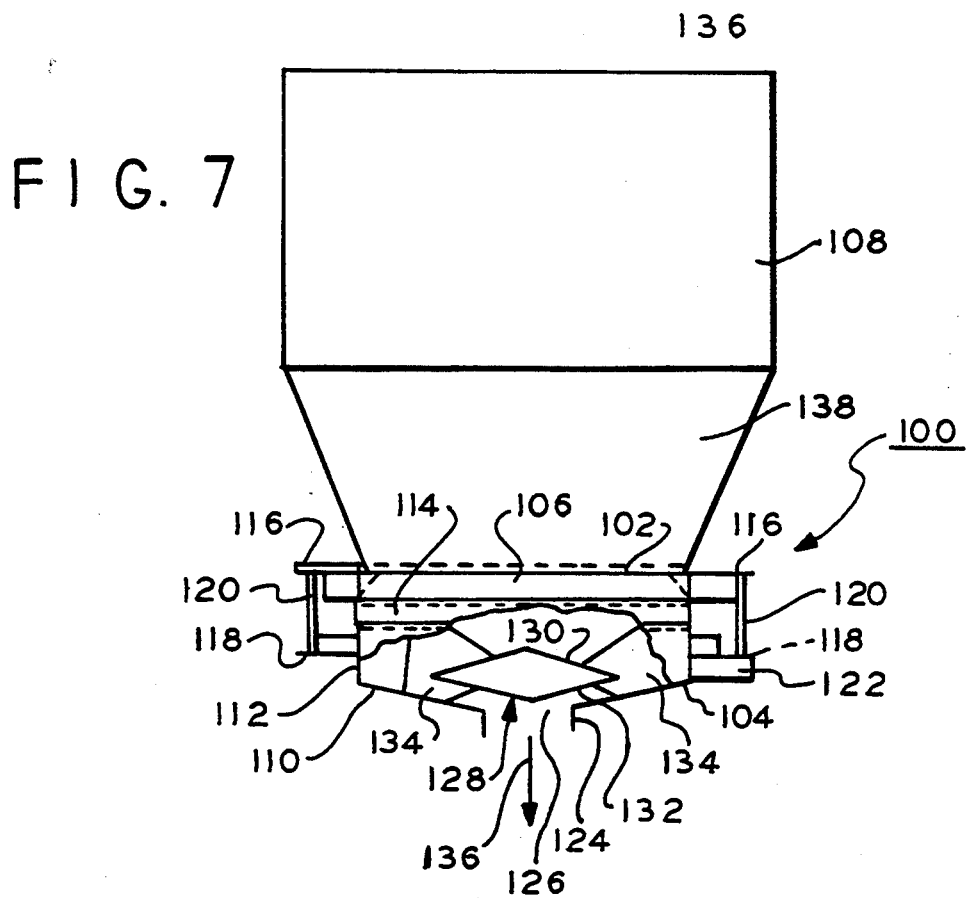
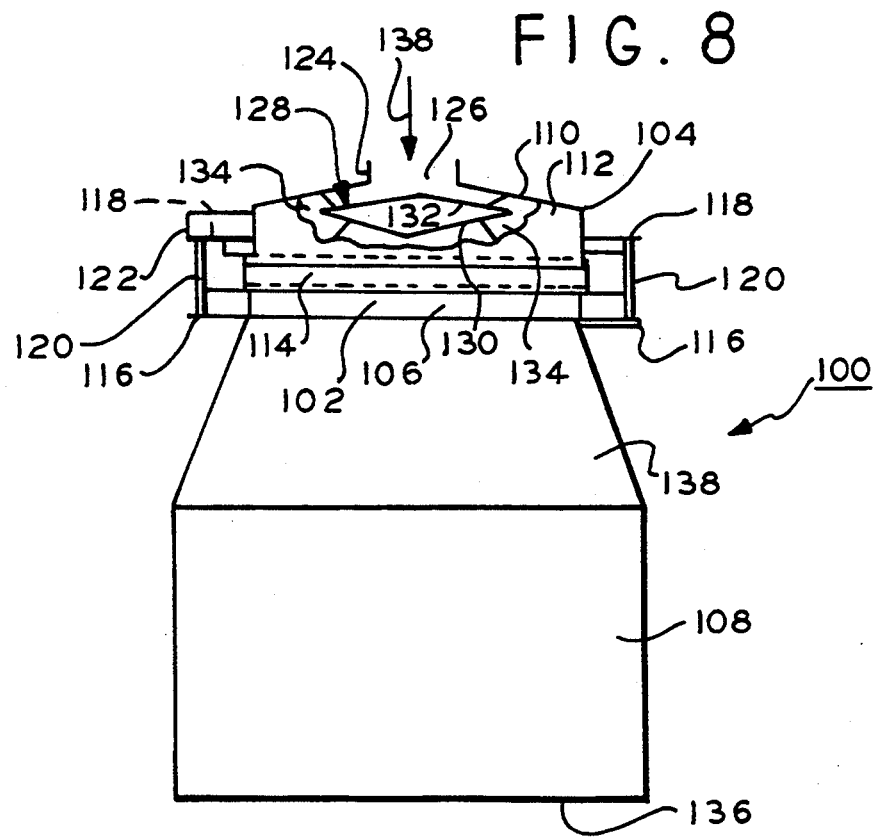

5,413,254

VIBRATORY FEEDER

This invention relates to portable feeders for attachment to and for vibratory feeding granular particles from a storage bin.

Vibratory feeders are known and are sometimes referred to as vibratory bin activators. These feeders include a feed housing including a baffle spaced from a housing bottom wall adjacent to a discharge port. The housing is releasably attached to the bottom of a storage bin storing the particles to be discharged. The feeder is secured suspended from the storage bin in vibration isolation usually with a flexible collar and isolation suspension devices. The baffle spacing is such that the particles which fill the housing normally remain within the housing and do not flow out the feeder discharge port.

A vibratory drive device is attached to the housing for vibrating the housing and the baffle. The vibrations cause the particles to flow out the discharge port between the baffle and the housing bottom wall. The spacing of the baffle to the housing bottom wall is such that certain particles of selected sizes are flowed by the particular feeder used.

The baffle is typically an inverted cone or convex member that is fixed to the feeder housing. Examples of such feeders are shown in U.S. Pat. Nos. 3,261,508; 3,853,247; 4,545,509; 3,973,703 and 4,285,447, all incorporated by reference herein. The '247 (the last three digits of the patent number) patent illustrates a baffle arrangement for drawing material from various regions of a storage bin. In the '703 patent the baffle arrangement is somewhat different using a plurality of inclined parallel plates reciprocally mounted relative to a base member. When the plates are reciprocated, the material is caused to flow therebetween.

The above feeders are used with stationary storage bins. When it is desired to transport materials, a material is stored in a portable bin via an opening in the top cover and having a shutoff gate at a discharge opening. The portable bin is then shipped to a receiving station. At the receiving station the portable bin is placed over an oscillating frame at an oscillating station to assure flow. The gate is used to empty the contents via gravity.

The present inventor recognizes a need to provide a portable feeder which can be transported with the portable bins to preclude the need for the oscillating station. The present inventor also recognizes a need for a feeder that is adaptable for different flow requirements including blending of particles from stationary bins. Blending different particles to be relatively homogeneously mixed together is not easily accomplished with present vibratory feeders.

Apparatus according to the present invention for flowing material stored in a bin having a lowermost opening through which the material flows to the apparatus comprises a material receiving member having a central material discharge port in a bottom wall thereof and including means for coupling the member to the bin for receiving the material from the bin through said lowermost opening. The member has an inlet opening corresponding to the lowermost opening for receiving the material in an axial direction, the member including an annular peripheral side wall upstanding from the bottom wall defining a material receiving cavity with the bottom wall. Baffle means are secured to the member in the cavity for selectively providing different flow paths for the material to the discharge port. Means releasably suspend the material receiving member from the bin. Means vibrate the suspended material receiving member and baffle means to flow the material to the discharge port from between the baffle means and the member.

In one embodiment the baffle means selectively provide a central flow path and an annular peripheral flow path to achieve blending of the material when comprising different materials.

In a further embodiment, the baffle means provide at least one adjustable flow path.

In a still further embodiment, an apparatus is provided for flowing material to and from a bin having first and second opposite orientations, the bin having a first opening through which the material flows from the bin to the apparatus in the first bin orientation and for flowing material into the bin in the second bin orientation. The apparatus comprises a material receiving member having a central port in a bottom wall thereof and including means for coupling the member to the bin for respectively receiving and discharging the material from and to the bin through the first opening, the member having a second opening corresponding to the first opening for selectively receiving and discharging the material in an axial direction. The member includes an annular peripheral side wall upstanding from the bottom wall and defining a material receiving cavity. Baffle means are coupled to the member for controlling flow of material from the cavity to the central port and for controlling the flow of material from the central port to the cavity. Means couple the member to the bin and further means are coupled to the material receiving member for receiving means for vibrating the material receiving member and the baffle means.

The baffle means in one embodiment comprises a symmetrical pair of cones with oppositely facing apices for controlling the flow of material out of and into the cavity. Thus the same feeder can be used to both fill and empty a container such as a drum used to transport the material.

IN THE DRAWING

FIGS. 7 and 8 are side elevation views, partially in section, of the embodiment of FIG. 6 illustrating the apparatus in respective discharge and fill modes relative to a storage container;

Figure 1:
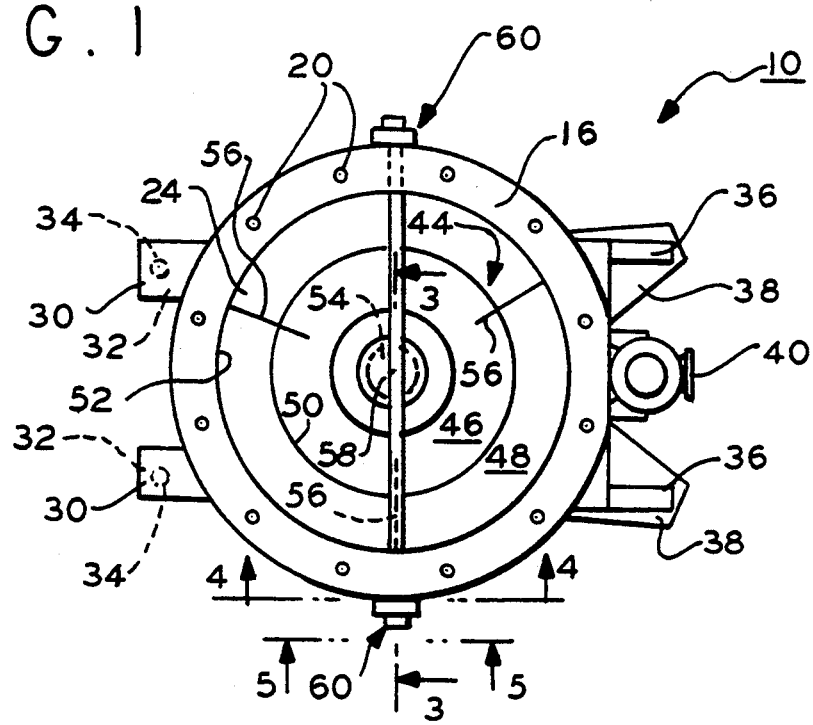
FIG. 1 is a plan view of one embodiment of a feeder according to the present invention.
Figure 2:
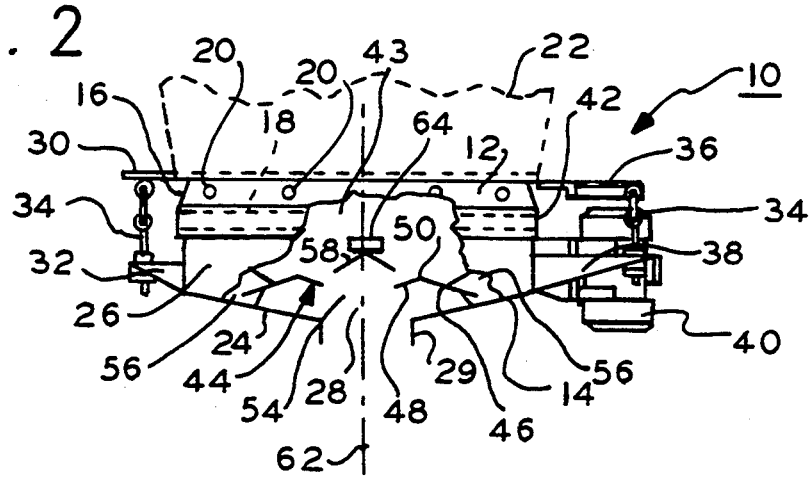
FIG. 2 is a side elevation view, partially in section, schematically illustrating a baffle arrangement according to one embodiment of the present invention.

In FIGS. 1 and 2, vibratory feeder 10 comprises an upper sheet metal member 12 and a lower sheet metal member 14. Upper member 12 is a circular cylinder having an upper inwardly inclined shoulder 16 and a downwardly depending side wall 18. An annular array of bolt holes 20 are used to secure the upper member 12 to a mating portion of a material storage bin 22 (shown in phantom).

The lower member has a concave bottom wall 24 and an upstanding annular peripheral side wall 26. A material discharge port 28 formed by nozzle 29 is located centrally in the bottom wall 24. A pair of upper suspension support brackets 30 extend radially outwardly from upper member 12. A pair of lower brackets support brackets 32 extend from lower member 14 side wall 26 each juxtaposed and aligned with a different corresponding upper bracket 30. A suspension vibration isolation linkage 34 is connected between each pair of aligned upper and lower brackets. The linkage includes a threaded shaft connected by links to the upper bracket and bolted to the lower bracket employing isolation bushings 44 (not shown). Each of the lower and upper aligned brackets are connected by a separate isolation linkage. By way of example, an isolation linkage is utilized in the '508 patent incorporated by reference herein which may be used in the alternative. Other isolation arrangements may be used as illustrated in others of the aforementioned patents.

On the opposite side of the feeder 10 are a second pair of upper support brackets 36 and a second pair of aligned lower support brackets 38, one upper bracket being aligned with and corresponding to one lower bracket as shown. The upper brackets 36 are secured to the upper member 12 and the lower brackets are secured to the lower member 14. A corresponding set of vibration isolation linkages 34 are connected to and between these aligned brackets. A vibratory drive 40 is secured to the side wall 26 for vibrating the suspended lower member 14 in vibration isolation from the upper member 12. The drive 40 may be electrical or pneumatic as known in this industry. For example, reference is made to the aforementioned patents for illustration of such drives.

A flexible connecting collar 42, preferably rubber or other vibration absorbing material, is clamped to the peripheral outer surfaces of the upper and lower members 12 and 14. Collar 42 seals the cavity formed by upper member 12 and lower member 14 and provides vibration isolation therebetween in a known manner.

Located in fixed spaced relation to the bottom wall 24 centrally relative to the discharge port 28 is primary baffle 44. Baffle 44 is a circular ring which is a segment of a toroid having angularly connected sides. The baffle 44 comprises an outer annular section 46 and an inner annular section 48. Sections 46 and 48 are each a segment of a cone inverted relative to one another and joined at an annular apex 50 which faces toward opening 52 of the upper member 12. The outer section 46 may extend radially outwardly a greater extent than the radially inwardly extent of inner section 48. The baffle 44 may be formed by stamping from sheet metal, for example.

The outer peripheral edge is spaced above the surface of the bottom wall an amount sufficient to normally preclude flow of granular or particulate material filling the cavity 43 of the members 12 and 14 and collar 42 due to principles explained more fully in the aforementioned patents '508, '247 and '703. When the baffle 44 and member 14 are vibrated by drive 40 the particulate material flows through the space between the baffle 44 outer peripheral edge and the upper surface of the bottom wall 24 in a known way. The baffle 44 is secured to member 14 in fixed relation to member 14 and has a central opening 54.

A set of multiple equally spaced support vanes 56 secure the baffle 44 to the member 14. The vanes are sheet metal and generally triangular, the vanes being welded to the baffle 44 and to the inner surface of the side wall 26.

A central baffle 58 is disposed over the opening 54 of baffle 44 between baffle 44 and the upper member 12 opening 52. Baffle 58 may also be stamped sheet metal and is conical. The apex of the cone points toward upper opening 52. The outer peripheral edge region of the baffle 58 overlies the inner edge region of baffle 44. This spaced relation of the central baffle 58 to the primary baffle 44 is determined in a manner similar to that of the spacing between baffle 44 and the bottom wall 26. This spacing is sufficient so that no material flow occurs therebetween without vibration of the baffles 44 and 58. Once these baffles are vibrated then the particulate material flows therebetween.

However, an adjustment mechanism 60, FIG. 1, adjusts the spacing of baffle 58 to baffle 44 by axially moving baffle 58 along axis 62. This spacing is settable anywhere from a maximum for a given implementation for a given material to a minimum in which the central baffle 44 opening 52 is closed by baffle 58. The mechanism 60 adjusts the position of the baffle 58 along axis 62 continuously in analog fashion in this embodiment. In a different embodiment discussed below, this spacing can be set to either a fixed open spaced relation relative to baffle 44 or to a closed position.

Figure 3:
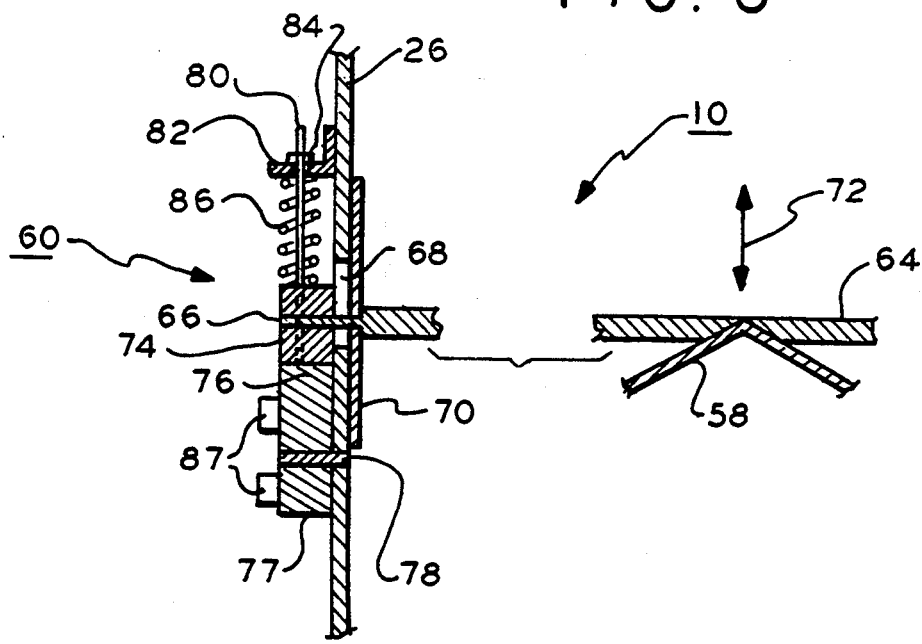
FIG. 3 is a sectional elevation view of the apparatus of FIG. 1 illustrating a portion of a mechanism for moving the central upper baffle taken along lines 3—3.
Figure 4:
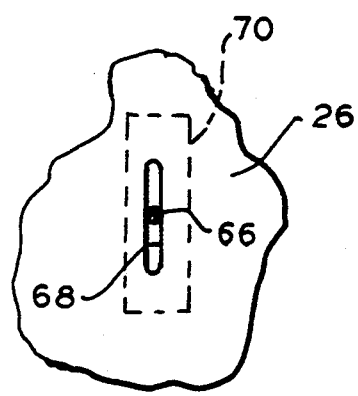
FIG. 4 is a side elevation sectional view of the apparatus of FIG. 1 taken along lines 4—4.
Figure 5:
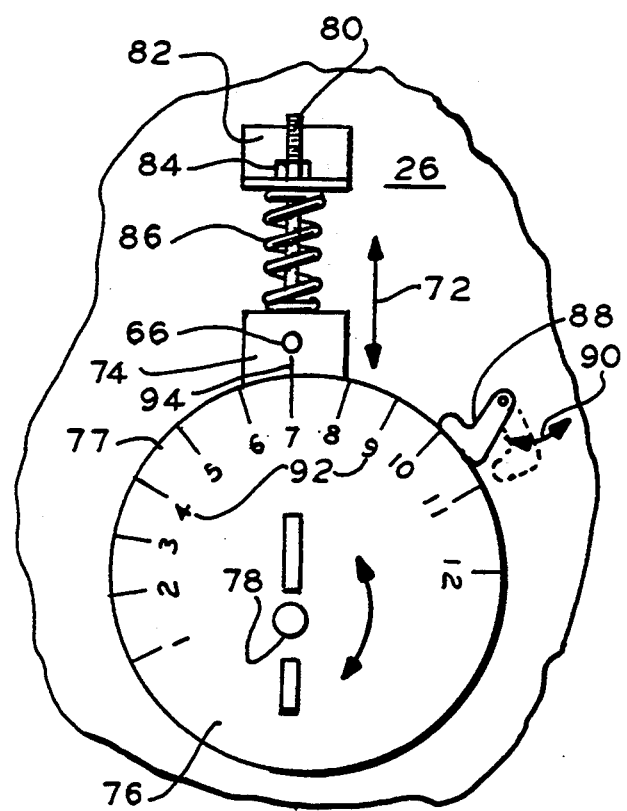
FIG. 5 is a side elevation view of the apparatus of FIG. 1 taken along lines 5—5.

In FIG. 3, baffle 58 is secured to a cross member 64 which is a beam which extends across cavity 43. The member 64 has two end extensions 66, one being shown, Each extension passes through a guide slot 68 in opposite sides of the side wall 26, FIGS. 3 and 4. A cover plate 70 is secured to member 64 for covering slot 68 as the member 64 extension moves in directions 72 in the slot 68 and as member 64 is displaced in these directions by mechanism 60. Cover plate 70 preclude particles from entering the slot 68 and jamming the mechanism.

A cam follower 74 is secured to the end of the extension 66. An eccentrically mounted circular camming disc 76 is pivotally secured to wall 26 by pin 78. A guide shaft 80 is secured to follower 74. A bracket 82 supports a guide bushing 84 which slidably receives guide shaft 80. A compression spring 86 is between follower 74 and bracket 82 for forcing the follower 74 to abut the cam disc 76 cam surface 77. A pair of knobs 87 on the disc 76 permit manual rotation of the disc 76 about pin 78 camming the follower in directions 72 in accordance with the direction of rotation of the disc 76. While the disc 76 is shown circular, it may also be of other shapes to provide a desired camming action. The surface 77 of the disc 76 provides a continuously gradually variable camming displacement of the extension 66 and thus of the baffle 58 in directions 72. A wedge member 88 is rotatably secured to wall 26 in directions 90 for manually locking the disc 76 in place (solid line) and for selectively releasing the disc for rotation (phantom lines).

Indicia 92 include marker lines and reference numerals for identifying and locating a desired position of the cam disc 76 relative to a fixed reference mark 94. The mark 94 is on follower 74 but may be on other elements according to a given implementation. The reference numerals correspond to a given axial displacement of the baffle 58 relative to baffle 44. For example numeral 12 may represent a fully open position of baffle 58 and numeral 1 a fully closed position where baffle 58 abuts baffle 44. As is plain, the baffle 58 is adjustable to any axial position between the two extreme positions. A mechanism 60 is secured to each end extension of the cross member 64.

In operation, the cam disc 76 on one side is set to a desired baffle 58 spacing to baffle 44 by rotation to a predetermined reference numeral in accordance with a table or other prearranged correspondence of reference numerals to displacement of the baffle 58. Once the desire position is reached, the cam on the one side is locked by member 88. The disc 76 on the opposite side of member 14 is then adjusted similarly. This axially places the baffle 58 in the desired position. As known, different particle sizes and characteristics may require different spacings. These are set by baffle 58.

Preferably, however, the baffle 58 is used in a blending operation wherein when open, material flows in a straight downward path in pipeline fashion whereas the baffle 44 provides a more tortuous route. This provides a blending of different materials, for example, different colored particles of the same characteristics. The central baffle 58 may be used for other mixing arrangements in accordance with a desired implementation. When desired, the baffle 58 may be closed to provide vibratory flow only between baffle 44 and bottom wall 24. The vibratory drive is then activated after the baffle 58 is positioned.

Figure 6:
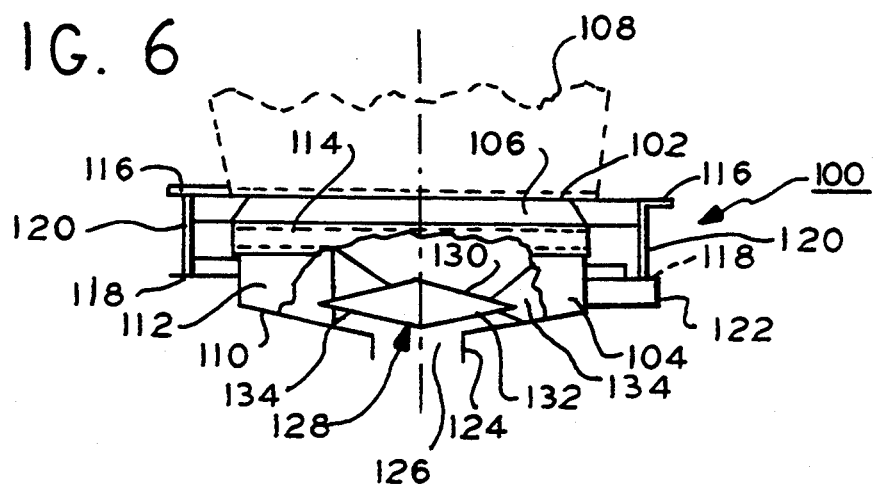
FIG. 6 is a side elevation view, partially in section, schematically illustrating a baffle arrangement according to a second embodiment of the present invention.

In the embodiment of FIG. 6, a feeder 100 is shown which can feed material in either of two inverted orientations of the feeder. Feeder 100 comprises an upper member 102 and a lower member 104. Member 102 includes a shoulder 106 for attachment to a storage bin 108 by bolt holes in shoulder 106 (not shown). Concave bottom wall 110 is surrounded by an upstanding peripheral side wall 112. A flexible collar 114 connects and vibration isolates the upper and outer members at side wall 112. A pair of upper brackets 116 are secured to upper member 102 in spaced relation on opposite sides of the feeder. A pair of lower brackets 118 are aligned on each side each beneath a corresponding upper bracket 116. A flat metal spring 120 is attached to each of a corresponding upper bracket 116 and lower bracket 118. The flat springs support the upper and lower members in the inverted orientations of FIGS. 7 and 8 while providing vibration isolation between the members. A horizontally oriented vibratory drive 122 is releasably secured to lower member 104. The bottom wall 110 has a depending nozzle 124 forming a material discharge and inlet port 126, depending on the orientation of the feeder 100. In the orientation of FIG. 6, the port 126 is for material discharge.

A dual acting baffle 128 is formed by attaching two cones 130 and 132 to each other at their edges to form a hollow baffle, preferable stamped sheet metal. The cones 130 and 132 are preferably identical. The slope of the conical surface of the baffle facing the bottom wall 110 is preferably the same as the bottom wall 110, but may differ therefrom according to particular implementations. The spacing of the lower cone 132 facing bottom wall 110 determines the flow characteristics of the material employed and is therefore determined for that material in a known way as described above for the embodiment of FIGS. 1 and 2. For example, the outer edge of the baffle 128 may be closest to the bottom wall 110 surface and the remainder of the facing baffle cone 132 may be at a greater distance from the bottom wall 110. The baffle 128 overlies completely the port 126. The baffle 128 is held in place by multiple vanes 134 equally spaced about the baffle 128 and welded to the baffle and member side wall 112. The drive 122 being releasably attached to the member 104 is installed by a user for either filling or emptying the bin 108.

In operation, the bin 108 is filled by the feeder 100, FIG. 8. The vibratory drive 122 is attached and a cap (not shown) over port 126 is removed. The cap seals the interior of the bin from leaks and the like. For example, the bin 108 may be drum like in size and shape with a flat bottom 136 and a tapered neck portion 138. The flat bottom is for ease of transportation of the bin and the tapered neck portion is shaped to permit easy attachment of the feeder 100. The feeder 100 without a vibratory drive is attached to each bin as it is transported. A recipient of the bin has a local vibratory drive which is attached to the feeder 100 when it is desired to empty the bin.

To fill the bin, FIG. 8, a feed source of the material (not shown) is placed over the port 126 which is an inlet port at this time. Material flows into the port but its flow is arrested by the spacing between the baffle 128 and the facing surface of the bottom wall 110 of the feeder member 112. In this situation, the spacing between the cone 132 surface and the bottom wall 110 determines the flow characteristics for the non-vibratory state of the feeder 100. Therefore, the shape of the cone 132 surface and the overlying surface of bottom wall 110 is significant in this orientation. Their spacing must be such as to provide both the arresting and flow actions of the material in accordance with the principles outlined in the aforementioned patents incorporated by reference herein. Therefore, the shape of the cone 132 and the bottom wall should be arranged for this function.

Once the bin 108 is filled, a cap (not shown) is placed over the nozzle 124 to seal the port 126. The cap may be threaded in place or otherwise tightly and leak proof sealed to the nozzle. The bin so capped may then be safely transported without leakage to a destination. The feeder 100 remains with the bin as transported. The feeder 100 is relatively low cost wherein the members 102 and 104 are fabricated of spun metal. The vibratory drive 122 is not transported with the bin but in the alternative could be so shipped if desired. Normally, the recipient would keep a vibratory drive for emptying the bin 108.

To empty the bin, the bin 108 is inverted as in FIG. 7. The feeder 100 baffle 128 is so spaced from the bottom wall 110 in this orientation so as to preclude material flow to port 126 until the bin and baffle are vibrated. When vibrated, material flows through the discharge port 126 from between the baffle 128 and bottom wall 110, the cap having been previously been removed. Thus, the same feeder 100 is used both for fill and emptying modes of the bin 108.

Figure 9:
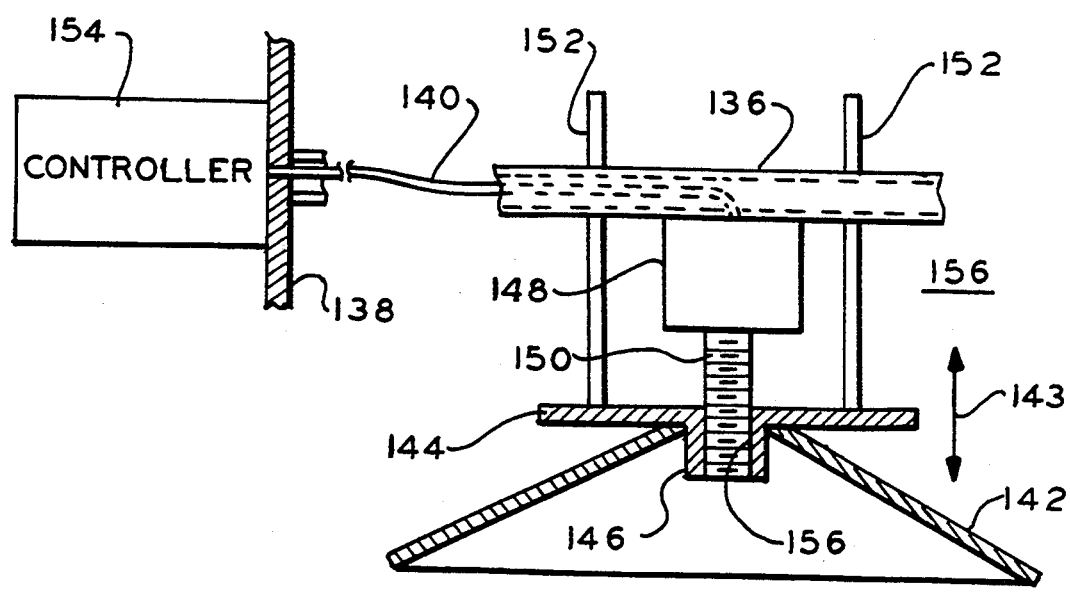
FIG. 9 is a side elevation fragmentary sectional view of a third embodiment of the present invention for displacing the central baffle of the embodiment of FIG. 2.

In FIG. 9, another embodiment of apparatus for displacing the adjustable baffle of the embodiment of FIG. 2 is shown. A cross beam 136 extends across the cavity of the feeder members and collar and secured at its ends to the lower feeder member 138. Beam 136 is hollow to accommodate wiring 140. A conical baffle 142 which is adjustable in directions 143 is secured to support plate 144 having a threaded projection 146. A stepping motor 148 is secured to beam 136. Motor 148 is of the type that can be accurately controlled so that its threaded shaft 150 can be rotated in precise angular increments via a controller 154 secured to member 138 external the feeder cavity 156. Motor 148 and controller 154 are commercially available.

Threaded shaft 150 is engaged with the threads 156 of projection 146. A pair of guide rods 152 are secured to plate 144 and pass through the beam 136 and are guided thereby. Bushings. (not shown) may be used to guide the rods in the beam 136. The rods 152 preclude rotation of the plate 144 and baffle 142. Plate 144 is a circular disk. While two rods 152 are shown, more may be included if desired.

Rotation of the shaft 150 causes axially displacement of the baffle 142 in a selected one of directions 143. Since rotation of the shaft 150 can be accurately controlled, the axial displacement of the baffle 142 is also accurately controlled to any position between the extremes of travel of the baffle from a closed position abutting the fixed baffle 44, FIG. 2, to the maximum open spacing to the fixed baffle.

Figure 10:
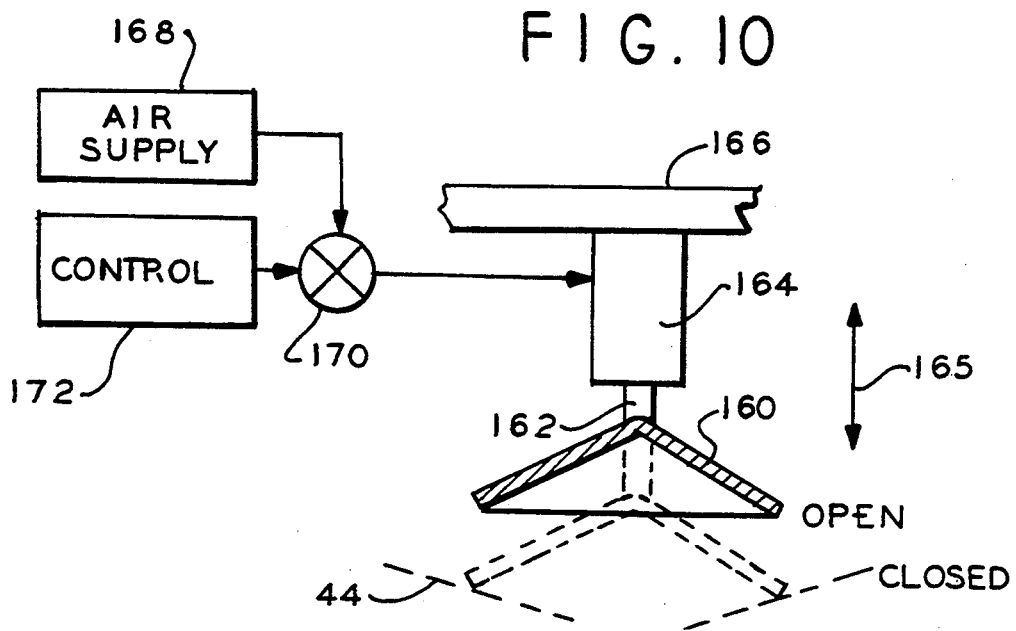
FIG. 10 is a fragmentary side elevation view similar to that of FIG. 9 illustrating another embodiment for displacing the central baffle.

FIG. 10 illustrates another embodiment for displacing the adjustable baffle of FIG. 2. In FIG. 10, adjustable conical baffle 160 is secured to the shaft 162 of a pneumatic solenoid or piston device 164. The shaft 162 has two extreme positions in opposite directions 165. The device 164 is secured to cross beam 166 which in turn is secured at its ends to the feeder housing lower member (not shown in this figure). An air supply 168 of pressurized air is coupled to the device 164 through a valve 170. The valve 170 is opened or closed by control 172. Depending on the state of the valve 170, the shaft 162 of device 164 is either fully extended (phantom) abutting the lower baffle 44 or fully retracted (solid lines) in the open material flow condition in the corresponding one of directions 165.

While particular embodiments have been described herein, it will occur to those of ordinary skill that modifications can be made to these embodiments. It is intended that the appended claims define the scope of the present invention and that the description of the embodiments herein is illustrative, and not limiting.

What is claimed is:

1. Apparatus for flowing material stored in a bin having a lowermost opening through which the material flows to the apparatus, said apparatus comprising:
   a material receiving member having a central material discharge port in a bottom wall thereof and including means for coupling the member to the bin for receiving said material from said bin through said lowermost opening, said member having an inlet opening corresponding to the lowermost opening for receiving said material in an axial direction, said member including an annular peripheral side wall upstanding from the bottom wall defining a material receiving cavity with said bottom wall;
   baffle means secured to the member in the cavity for selectively providing different flow paths for said material to said discharge port;
   means for suspending the material receiving member from the bin; and
   means for vibrating the suspended material receiving member and baffle means to flow the material to said discharge port from between said baffle means and said member.

2. The apparatus of claim 1 wherein said baffle means comprises a first baffle comprising a ring having a central material receiving opening, said ring having a convex surface extending thereabout and facing said inlet opening, said ring being radially spaced from said peripheral side wall and axially spaced from said member bottom wall; a second baffle adjustably secured relative to and axially spaced from the first baffle, said second baffle having a convex surface facing said inlet opening and disposed over said first baffle material receiving opening; and means for axially adjusting the second baffle spacing to the first baffle.

3. The apparatus of claim 1 wherein said baffle means includes means for providing a first annular peripheral flow path and selectively providing a central flow path to said discharge port.

4. The apparatus of claim 3 including means for selectively opening and closing said central flow path.

5. The apparatus of claim 4 wherein the central flow path is aligned axially with the inlet opening and the discharge port.

6. The apparatus of claim 2 wherein the spacing of the second baffle to the first baffle is settable to different spacings.

7. The apparatus of claim 2 wherein the second baffle is a conical member inverted relative to the member bottom wall surface adjacent to the member discharge port.

8. The apparatus of claim 2 wherein the first baffle comprises sheet material including inner and outer ring portions connected to each other at an annular apex, each portion respectively extending radially inwardly and outwardly and further extending axially from said apex in a direction toward said member discharge opening.

9. The apparatus of claim 8 wherein the outer ring portion extends radially outwardly a greater extent than the inwardly extending inner ring portion.

10. The apparatus of claim 2 wherein said means for axially adjusting the second baffle includes cam means coupled to said member and to said second baffle for varying the spacing between the first and second baffles in continuous analog increments.

11. The apparatus of claim 10 wherein said cam means includes first and second like cam means disposed on diametrically opposite sides of said member.

12. The apparatus of claim 11 wherein said first and second cam means each include identical indicia for permitting the manual setting of each of the first and second cam means to substantially the same settings.

13. The apparatus of claim 2 wherein said means for axially adjusting the second baffle includes motor means coupled to said member and to said second baffle for electrically controlling the spacing between the first and second baffles.

14. The apparatus of claim 2 wherein said means for axially adjusting the second baffle includes pneumatic piston means having a piston connected to said second baffle for selectively abutting the second baffle with the first baffle in a closed condition and for spacing the second baffle from the first baffle in an open condition.

15. Apparatus for flowing material to and from a storage bin having first and second opposite orientations, said bin having a first opening through which the material flows from the bin to the apparatus in the first bin orientation and through which material flows into said bin in the second bin orientation, said apparatus comprising:

a material receiving member having a central port in a bottom wall thereof and including means for coupling the member to the bin for respectively receiving and discharging said material from and to said bin through said first opening, said member having a second opening corresponding to the first opening for selectively receiving and discharging said material in an axial direction, said member including an annular peripheral side wall upstanding from the bottom wall and defining a material receiving cavity;

baffle means coupled to the member for controlling flow of material from said cavity to said central port and for controlling the flow of material from said central port to said cavity;

means for coupling the member to said bin; and means coupled to the material receiving member for receiving means for vibrating the material receiving member and said baffle means to thereby cause flow of said material between said baffle means and said member in response to vibrations.

16. The apparatus of claim 15 wherein the baffle means includes a symmetrical baffle member having a first convex surface facing the second opening in spaced relation therewith and a second convex surface on a side of the baffle opposite the first surface, said second convex surface being juxtaposed with and facing said central port.

17. The apparatus of claim 15 wherein the baffle means comprises two oppositely oriented conical members.

18. The apparatus of claim 15 wherein said means for coupling includes an array of flat spring elements secured at one end about and to said side wall and means for releasably securing a second end of said elements opposite the one end to said bin for vibratory isolating said bin and side wall, and resilient collar means releasably secured to said side wall for vibration isolating said side wall from said bin and for enclosing the region between said first and second openings.

19. The apparatus of claim 15 further including means for vibrating said material receiving member and baffle releasably secured to said means for receiving said means for vibrating.

20. A vibratory operated feeder for feeding material from a material storage bin through a discharge opening, said feeder comprising:

a housing having a bottom wall with a central discharge port and an annular peripheral side wall upstanding from said bottom wall at an outer edge thereof to form a cylindrical material receiving cavity in communication with said port along an axis;

a first baffle in said cavity comprising a ring having a central material receiving opening, said ring having a surface extending thereabout and facing away from said central port, said ring being radially spaced from said peripheral side wall and axially spaced from said member bottom wall;

a second baffle movably secured relative to said member for axial displacement in said cavity relative to the first baffle for selectively changing the size of said central material receiving opening, said second baffle having a convex surface facing away from and disposed over said first baffle material receiving opening;

means for axially adjusting the second baffle spacing to the first baffle surface;

means for releasably attaching the material receiving member to said material storage bin; and means for receiving means for vibrating the suspended material receiving member including said baffles.

21. Apparatus for flowing material stored in a bin having a lowermost opening through which the material flows to the apparatus, said apparatus comprising:

a material receiving member having a central material discharge port in a bottom wall thereof and including means for coupling the member to the bin for receiving said material from said bin through said lowermost opening, said member having an inlet opening corresponding to the lowermost opening for receiving said material in an axial direction, said member including an annular peripheral side wall upstanding from the bottom wall defining a material receiving cavity with said bottom wall;

baffle means secured to the member in the cavity for selectively providing at least one settable flow path for said material to said discharge port;

means for suspending the material receiving member from the bin; and means for receiving means for vibrating the suspended material receiving member and baffle means to flow the material to said discharge port from between said baffle means and said member.

22. The apparatus of claim 21 wherein said baffle means comprises means for providing a plurality of flow paths, at least one of which paths is settable to adjust the material flow rate therethrough.

23. The apparatus of claim 22 including a first baffle secured to the member for providing a first flow path with the member and an adjustable second baffle coupled to the member and which cooperates with the first baffle to provide a second flow path having an adjustable flow spacing for said material.

24. The apparatus of claim 23 wherein the second baffle is a conical member and the first baffle is ring shaped with a central opening with the conical member overlying the central opening of the first baffle.

25. The apparatus of claim 24 wherein the second baffle has a peripheral annular edge juxtaposed in adjustable relation from a surface of the first baffle.

26. The apparatus of claim 23 wherein the second baffle is adjustable to first and second positions to close the second flow path at the first position and to open the second flow path at the second position.

* * * * *